March 29, 1960    R. E. HOULE ET AL    2,930,545
AUTOMATIC CELESTIAL NAVIGATION CONTROL SYSTEM
Filed Jan. 23, 1956    6 Sheets-Sheet 1

*INVENTORS.*
ROBERT E. HOULE.
BY DONALD H. MENZEL.
EDWARD J. ROBB.
MAXWELL E. SPARROW — ATT'Y.

March 29, 1960

R. E. HOULE ET AL 2,930,545

AUTOMATIC CELESTIAL NAVIGATION CONTROL SYSTEM

Filed Jan. 23, 1956

INVENTORS
ROBERT E. HOULE.
BY DONALD H. MENZEL.
EDWARD J. ROBB.
MAXWELL E. SPARROW — ATT'Y.

March 29, 1960

R. E. HOULE ET AL 2,930,545

AUTOMATIC CELESTIAL NAVIGATION CONTROL SYSTEM

Filed Jan. 23, 1956

INVENTORS
ROBERT E. HOULE
BY DONALD H. MENZEL
EDWARD J. ROBB.

MAXWELL E. SPARROW, ATT'Y

FIG. 11

March 29, 1960 R. E. HOULE ET AL 2,930,545
AUTOMATIC CELESTIAL NAVIGATION CONTROL SYSTEM
Filed Jan. 23, 1956 6 Sheets-Sheet 5

*INVENTORS*
ROBERT E. HOULE
BY DONALD H. MENZEL
EDWARD J. ROBB
MAXWELL E. SPARROW —ATT'Y.

March 29, 1960 — R. E. HOULE ET AL — 2,930,545
AUTOMATIC CELESTIAL NAVIGATION CONTROL SYSTEM
Filed Jan. 23, 1956 — 6 Sheets-Sheet 6

INVENTORS
ROBERT E. HOULE
DONALD H. MENZEL
EDWARD J. ROBB
BY Maxwell E. Sparrow, ATT'Y.

United States Patent Office 2,930,545
Patented Mar. 29, 1960

2,930,545
AUTOMATIC CELESTIAL NAVIGATION CONTROL SYSTEM

Robert E. Houle, Willimantic, Conn., Donald H. Menzel, Cambridge, Mass., and Edward J. Robb, Mansfield, Conn., assignors to General Scientific Projects, Inc., Newington, Conn., a corporation of Connecticut Application January 23, 1956, Serial No. 560,594

27 Claims. (Cl. 244—14)

The present invention relates generally to the automatic guidance or navigation of manned aircraft or pilotless missiles, and is particularly directed to an automatic celestial navigation control system which, once the course or flight path of the aircraft or missile has been determined in advance, operates to maintain the aircraft or missile on the determined flight path indepedent of any further guidance or direction.

Heretofore, in the application for United States Letters Patent, Serial No. 35,497, filed June 26, 1948, by Robert E. Houle, it has been proposed to provide a "Long Range Automatic Celestial Navigation Device" which includes a platform mounted in gimbals and gyro-stabilized to form an artificial horizon. Upon this stabilized platform are standards for supporting a telescope or sight which is also mounted in gimbal rings so that the telescope is free to move about a horizontal axis to the zenith and also about a vertical axis, and motion of the telescope about these axes is effected by electric or Selsyn motors. The Selsyn motors are controlled by an arrangement which causes the telescope to point automatically toward, or "lock-in" upon, a selected star, and such arrangement includes a four-sided pyramidal prism having its apex at the prime focus along the optical axis of the telescope in order to spread the beam of starlight in four directions for impingement upon four related photocells acting in pairs. Any unbalance between the intensity of starlight impinging against the paired photocells, caused by asymmetrical location of the star image, will produce an unbalance in feed-back circuits associated with the photocells and the Selsyn motors so that the latter will move the telescope until the star image is again symmetrically disposed with respect to the prism and the balance of the light impinging against the photocells is thereby restored. For a given station, a given star and a given local sidereal time, the altitude and bearing of the star are known and calculable by simple formalae of spherical trigonometry so that, at any instant, the bearing of the telescope may be considered as a known quality, and the aircraft or missile may be maintained on course by providing an optical, electrical or mechanical linkage between the focal axis of the telescope and the gyrostabilized platform. Since the sight on a single star does not give a true fix, but only a line of position, accurate control of the timing and range of the aircraft or missile makes it necessary to provide a plot of a predetermined course on a strip map that takes into account the changes in the angle between the star and the longitudinal axis of the aircraft as the latter proceeds along a great circle path and that unrolls at a rate determined by an airspeed indicator. A beam of light emitted from a projector fixed to the lower end of the telescope is made to follow the plotted course on the unrolling strip map, so that the position of the longitudinal axis of the aircraft can be varied in a horizontal plane to coincide with the star sight, which is "locked" on the star, changing the bearing of the aircraft as delineated by the predetermined course.

It is apparent that the above described existing system has the disadvantage of requiring an advance knowledge of the time factors of the flight and of producing errors in the control of the flight path when such time factors are either advanced or retarded during the actual flight.

Accordingly, it is an object of the present invention to provide an automatic celestial navigation control system capable of maintaining an aircraft or guided missile on a predetermined flight path independent of the speed of travel or of the time of the flight so that any variance of the actual speed or time in flight from the speed and time in flight assumed in advance can have no affect upon the accuracy of the control of the flight path.

An automatic celestial navigation control system embodying the present invention is based upon spherical geometry defined by the normal to the great circle flight path between two designated points on the sphere: the launching point and the destination or target point. Each such normal defines a great circle that passes through the pole of the flight path. The point on the celestial sphere directly above this pole, we shall refer to as the "bearing point." Two such points exist, at opposite ends of a diameter. As simple geometry indicates, this bearing point lies on the horizon, in a direction perpendicular to the flight path.

The control system embodying this invention automatically defines an axis parallel to the polar axis of the earth, by a mechanism hereinafter described in detail. The system further defines the direction of the prescribed flight path with reference to the bearing point. Any departure from this preselected path defines a new bearing point, which the system determines automatically with reference to the polar axis of the earth, the great-circle plane along the flight-path.

In order to establish a "fix" reference, the control system embodying this invention employs a telescope having two objective prisms or adjustable mirrors, specially designed to receive light from two selected stars and direct the beams therefrom thorugh the objective lens system of the telescope. The two objective prisms or adjustable mirrors, when properly oriented, will send the starlight down the optic axis of the telescope, so that the images of the two selected stars will coincide at the focal point of the telescope and there impinge against the apex of a four-sided pyramidal prism, or suitable photo-sensitive detectors, which have four photocells or segments associated therewith and operating in conjunction with amplifier circuits to furnish electric correction voltages to three reversible electric motors adjusting the telescope in the latitude, longitude and azimuth directions in response to deviation of one, or both, of the star images from the apex of the pyramidal prism. When the images of both stars fall on this apex, the optical axis will then be parallel to the polar axis of the earth. It is an object of the above electric controls to keep the telescope so oriented.

In a control system embodying the present invention, the telescope is mounted by trunnions, on standards extending from a plate rotatable on a gyro-stabilized platform so that rotation about the horizontal axis of the trunnion provides latitude tracking; rotation about a vertical axis provides azimuth tracking; rotation of the two objective prisms about the optical axis of the telescope provides for both longitude tracking and rotation of the heavens at the sidereal rate. A light beam projector is fixed with respect to the standards supporting the telescope and projects a beam of light against a wedge shaped prism, which we will term "horizon-lock," and is adjustably mounted on the gyro-stabilized platform at a location corresponding to that of one of the bearing-points at right angles to the desired flight path, and two photocells are associated with the wedge shaped prism and operate in conjunction with amplifier circuits to furnish electronic correction voltages to a servo-system operating the controls of the aircraft or missile for providing the yaw corrections necessary to return the aircraft or missile to the desired flight path.

The foregoing, and other objects, features and advantages of the present invention will be apparent in the following detailed description of an illustrative embodiment of the invention which is to be read in connection with the accompanying drawings forming a part hereof, and wherein.

It is well known and easily shown that the bearing of an aircraft or missile continually changes during its movement along a great circle path, with the exception of one that runs due north or south; hence it is difficult to indicate the proper track or flight path of the aircraft or missile by reference to the bearings of the latter. If tracking is to be accomplished with reference to the continually changing bearing, it is necessary to assume a particular speed and also to assume that, at any time after take-off or launching, the aircraft or missile will have attained a particular point along the flight path at which the bearing is known. In order to avoid this introduction of a time factor into the control of the path of an aircraft or missile, and the consequent possibility of error when the actual speed does not equal the assumed speed, it has been necessary to adopt, in place of the bearing, some substitute that remains invariant along a great-circle path and to which the longitudinal axis or direction of the aircraft or missile can be related, in order to determine whether the latter is on or off course, and to establish yaw corrections for returning the aircraft or missile to the predetermined flight path.

Figure 1:
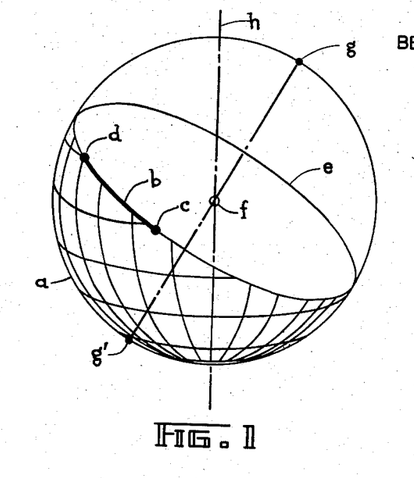
Fig. 1 is a diagrammatic representation of an assumed flight path along a great circle route on the earth's surface, and illustrating the spherical geometry on which the present invention is based.

Referring to Fig. 1, the spherical geometry of the earth is there represented at $a$ and is, in part, provided with the conventional geographic grid of lines of latitude and longitude. Assuming that an aircraft or missile is to be guided along a flight path $b$ from a take-off or launching site at $c$ to a destination or target at $d$, and that the path $b$ is part of the great circle $e$, it is apparent that the flight path $b$ bisects the sphere $a$ and that a line drawn from $f$, at the center of the earth, normal to the plane of the great circle, $e$, will intersect the surface of the sphere $a$ at opposite sides of the latter, at two invariant points $g$ and $g'$ on the surface of the sphere which are equidistant from the flight path $b$ along the entire length of the latter. As simple geometry indicates, the points $g$ and $g'$, are 90 degrees from the great-circle flight-path and hence define the poles of this great-circle. Also the point in the sky or celestial sphere directly above them will lie in the plane of the true horizon and, for reasons that will be apparent, are hereinafter referred to as "bearing points." Since the bearing points $g$ and $g'$ are invariant, for a given flight path along its entire length, as distinguished from bearings which are usually employed in navigation, and which vary along the path, it is only necessary to photo-electrically "fix" the optical axis of reference parallel to the polar axis $h$ to permit any departure from a prescribed flight path to be instantaneously detected and thence effect the necessary corrections in the planes of reference of the instrument and aircraft.

Figure 5:
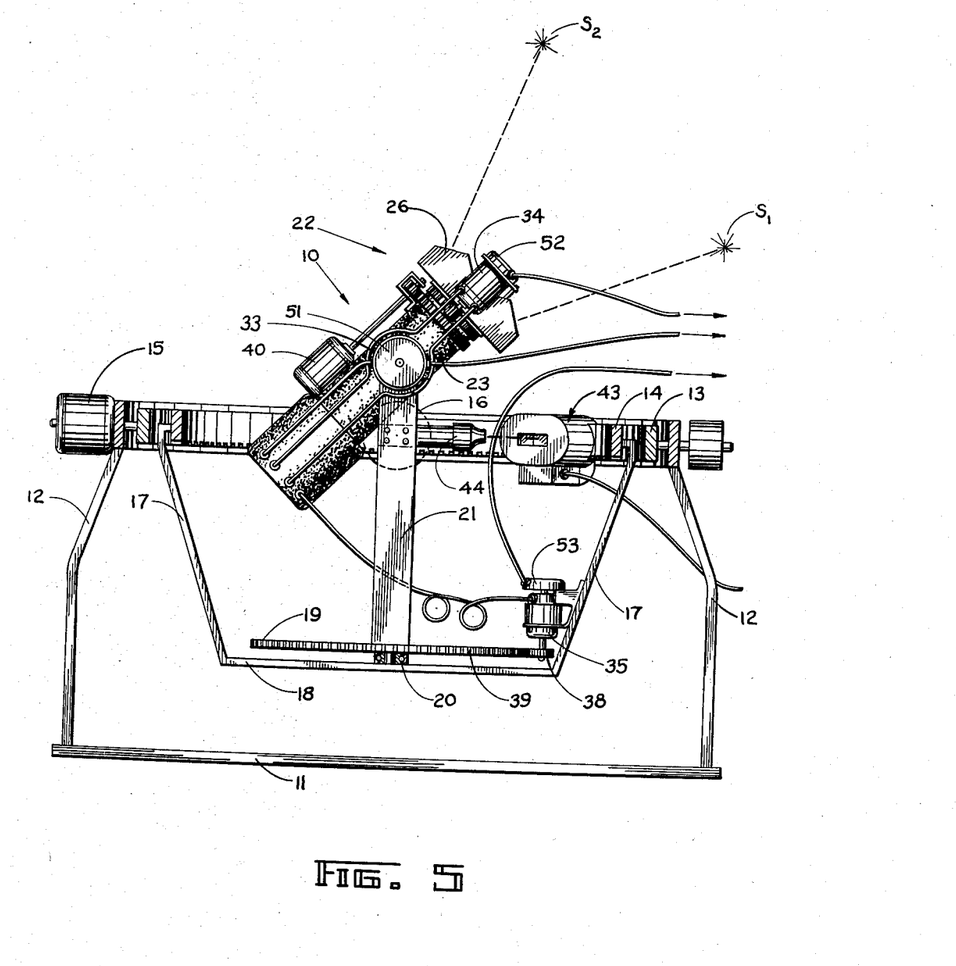
Fig. 5 is an elevational view, partly broken away and in section, of an automatic celestial navigation control device embodying the present invention.

Referring to Fig. 5 of the drawings, wherein an automatic celestial navigation control device embodying the present invention is illustrated and generally identified by the reference numeral 10, it will be seen that the device 10 includes a mounting plate 11 adapted to be secured in the aircraft or missile to be guided and having standards 12 extending therefrom to pivotally support an outer gimbal ring 13. An inner gimbal ring 14 is pivotally mounted within the ring 13 for rocking about an axis at right angles to the pivotal axis of the latter. A Selsyn motor 15 is connected to the outer gimbal 13 and a similar motor 16 is connected to the inner gimbal 14 to swing the outer and inner gimbals relative to the standards 12 and the outer gimbal, respectively, and the motors 15 and 16 are controlled by a slave gyroscope (not shown) in the usual manner so that, no matter what the attitude of the aircraft or missile and hence of the mounting plate 11, the inner gimbal 14 will remain horizontal, that is, in a plane tangent to the earth's surface at the point along the flight path where the aircraft or missile is then located.

Depending from the horizontally stabilized inner gimbal 14 are suspension members 17 which, at their low ends, carry a platform 18 on which an azimuth plate 19 is rotatably journalled, as at 20. Standards 21 extend upwardly from the rotatable azimuth plate 19 and, at their upper ends, rotatably support trunnions extending from a telescope assembly which is generally identified by the reference numeral 22.

Figure 6:
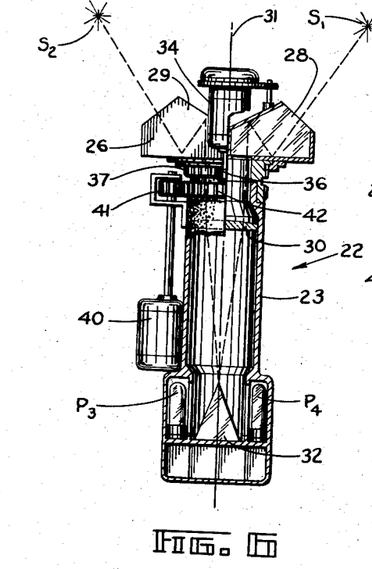
Fig. 6 is an elevational view, for the most part in axial section, of a telescope assembly included in the device of Fig. 5.
Figure 7:
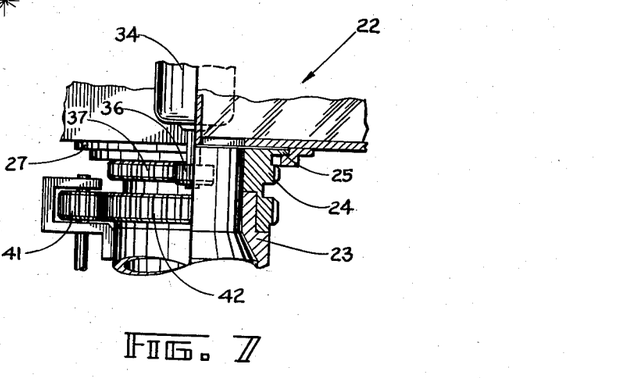
Fig. 7 is a fragmentary, enlarged detail view of a portion of Fig. 6.

As seen in Figs. 6 and 7, the telescope assembly 22 includes an elongated cylindrical casing 23 having a slip ring 24 rotatably disposed on one end, that is, the upper end, of the casing. The slip ring 24 has a flange 25 extending radially from the edge thereof remote from the casing 23, and a prism housing 26 is mounted on the slip ring against the flange 25 and has an annular member 27 embracing the flange to rotatably mount the prism housing on the slip ring. The objective prisms 28 and 29 are mounted in the housing 26 and are ground and arranged to sight two selected stars $S_1$ and $S_2$, respectively, and an objective lens 30 is disposed within the casing 23 to bring the beams of starlight to a focus. The prisms 28 and 29 and the lens 30 are disposed wtihin the telescope so that, when the images of the stars $S_1$ and $S_2$ are superposed at the focal point of the telescope, the optical axis 31 of the telescope, which coincides with the longtudinal axis of casing 23, will lie parallel to the polar axis of the earth.

A four-sided, pyramidal prism 32 is mounted in the base end of the casing 23 with the apex of prism 32 being disposed at the focal point of the telescope so that, as long as the optical axis of the telescope is parallel to the polar axis, the images will be superposed at the apex of prism 32 and equal quantities of light will be reflected from the four sides of the latter.

As seen in Figs. 14 to 17, inclusive, four photocells $P_1$, $P_2$, $P_3$ and $P_4$ are arranged symmetrically around the prism 32 to receive starlight emitted from the related four sides of the prism and to initiate corrective movements of the telescope when, for any reason, the optical axis of the telescope departs from a condition parallel to the polar axis and, as a consequence thereof, one or both of the star images is displaced from the apex of the prism 32 to cause an unequal distribution of starlight to the several photocells.

Figure 3:
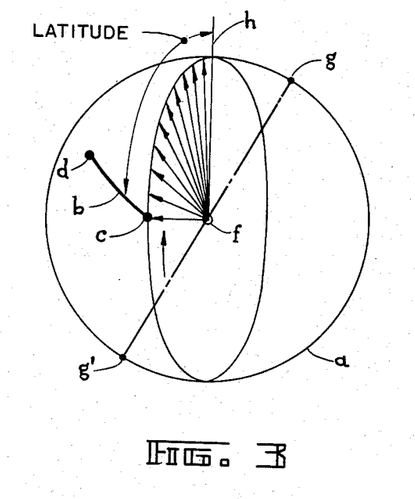
Fig. 3 is a view similar to Fig. 2, but representing the correction movements of the telescope in the plane of latitude.

The photocells $P_1$, $P_2$, $P_3$ and $P_4$ may be of the photomultiplier type and operate in conjunction wtih amplifier circuits, hereinafter more completely described, to furnish electronic alignment correction voltages to three reversible electric motors 33, 34 and 35 which provide corrections in the plane of latitude, in the plane of longitude and in the plane of azimuth, respectively. As seen in Fig. 5, the motor 33 is mounted on one of the standards 21 and moves the telescope assembly 22 about the axis defined by the trunnions supporting that assembly on the standards 21. In Fig. 3, the plane of rotation or swinging of the telescope assembly caused by the motor 33 is shown in relation to the planes of reference, and particularly the bearing points $g$ and $g'$, mentioned in connection with Fig. 1.

Figure 4:
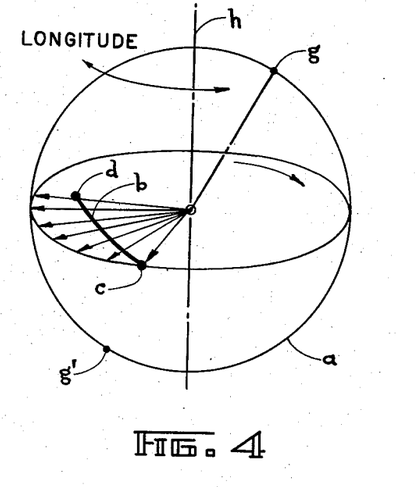
Fig. 4 is a view similar to Fig. 2, but representing the correction movements of the telescope in the plane of longitude.

The motor 34 (Figs. 5, 6 and 7) is mounted on the prism housing 26 and drives a pinion 36 that meshes with a spur gear 37 on the slip ring 24 thereby to rotationally adjust the prism housing relative to the slip ring, thus, providing both longitude tracking and local sidereal alignment of the objective prisms, an error manifested by separation of the star images, by measuring the difference between the apparent sidereal time and the sidereal time at the point of launching. Fig. 4 shows the plane of the rotation of the prism housing caused by the motor 34 in relation to the planes of reference, and particularly the bearing points $g$ and $g'$, mentioned in connection with Fig. 1.

Figure 2:
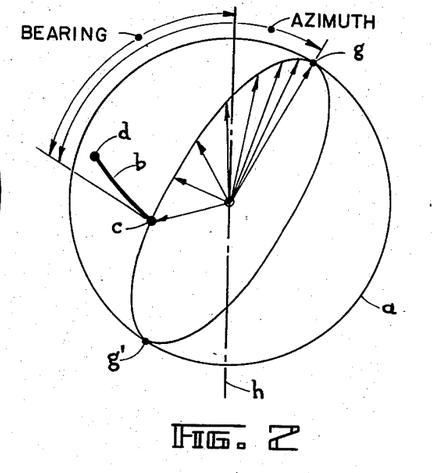
Fig. 2 is a diagrammatic view representing the correction movements of the telescope of a device embodying this invention in the plane of the azimuth.

The motor 35 (Fig. 5) is mounted on one of the standards 17 supporting the stabilized platform 18 and drives a pinion 38 that meshes with a spur gear 39 formed on the periphery of the azimuth plate 19 so as to rotate the latter, and with it the telescope assembly, about the pivot 20, and Fig. 2 shows the plane of the rotation caused by the motor 35 in relation to the reference planes, and particularly the bearing points $g$ and $g'$, mentioned above in connection with Fig. 1.

From Figs. 1 to 4, inclusive, it will be seen that the telescope movement in the plane of latitude extends through 180 degrees from the horizon, through the zenith, and back to the horizon; that the longitude varies through a 360 degree rotation normal to the sidereal motion, tracking the stars $S_1$ and $S_2$ about the polar axis; and that the azimuth of the bearing points ranges through 360 degrees in a horizontal plane.

Since the earth undergoes sidereal rotation about the polar axis, it is apparent that tracking of the fix stars $S_1$ and $S_2$ by the prisms 28 and 29 will require the introduction of a corresponding rotation of the prism housing 26 at the sidereal rate. Such rotation of housing 26 is effected by a motor 40 (Figs. 5 and 6) controlled by a sidereal clock and driving a pinion 41 (Figs. 6 and 7) meshing with a spur gear 42 on slip ring 24 to rotate the latter, and with it the prism housing 26, differentially with respect to the telescope casing 23.

Figure 14:
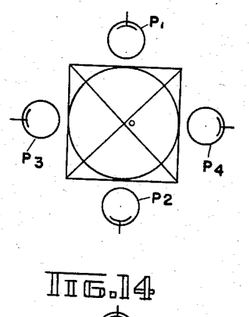
Figs. 14 to 17, inclusive, are diagrammatic views indicating the various conditions requiring corrective operations by the device embodying this invention.
Figure 15:
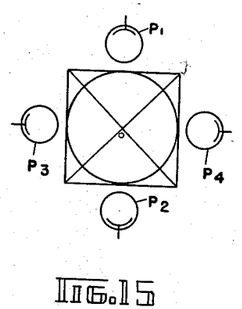
Figure 16:
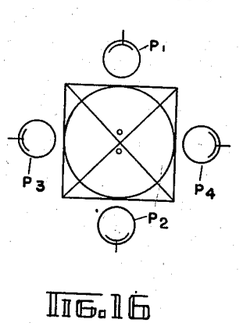

A variety of misalignment conditions may exist to place each star image at any point in the field of the telescope. The three basic conditions of star image displacement are shown in Figures 14, 15 and 16. The large circles in the diagrams represent the field of the telescope, the square and crossed diagonals represent a top view of the faces of the pyramidal prism 32 and the small circles labelled $P_1$, $P_2$, $P_3$ and $P_4$ are the four photocells (or other devices used to detect light) arranged to receive the light reflected from the prism faces.

Figure 14 shows the two star images superposed but displaced from the prism apex due to an error in azimuth. The resulting unbalance in the amplifier circuit associated with photocells $P_3$ and $P_4$ energizes the azimuth plate motor 35 affixed to the altazimuth mounting assembly, rotating the plate to the left and thus aligning the suporposed light-images on the apex of the pyramidal prism.

In a similar manner, the error in latitude alignment represented by the star image displacement of Figure 15 is translated into a electrical signal which energizes the latitude control motor 33 and thus lowers or raises the telescope to position the superposed star images on the prism apex.

The third basic condition which contributes to incorrect system alignment is that due to an error in the rotary position of the rotatable objective prisms. This leads to displacements of the star images typified by the example of Figure 16 and may be referred to as the separated light-beam condition. The resulting unbalance signals are utilized by the circuit of Figure 13 to energize the motor 34 which rotates the objective prism housing 26, thus bringing the star images into superposition at the apex cf the prism.

Figure 17:
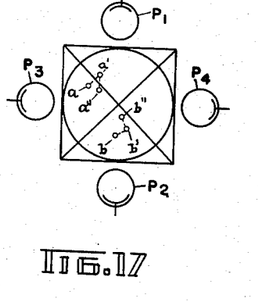

It is obvious that any combination of these three basic misalignment conditions may exist simultaneously. When the telescope is first directed toward the sky, it will not necessarily have its optical axis parallel to the axis of the earth's rotation. Also, the rotatable objective prisms may not be set at the exact angle for the given sidereal time. Hence, the two stellar images will not necssarily coincide at the prism apex. Instead we may encounter a condition of which Figure 17 is representative. A description of the correction sequence for this case will serve to illustrate the operation of the detection and correction system.

The initial positions of the stellar images are shown at $a$ and $b$. The photoelectric system first senses unbalances in both azimuth and latitude. Simultaneous operation of motors 33 and 35 cause the star-images to be moved to the approximate positions denoted by $a'$ and $b'$. Under this condition, azimuth and latitude photocell pairs are in balance. However, the circuit of Figure 13 operates to energize motor 34 which rotates the objective prism housing causing the star images $a'$ and $b'$ to move toward $a''$ and $b''$, respectively. Should one of the spots cross a diagonal, however, azimuth error is sensed and tends to maintain the images in quadrants 1 and 2. Thus, the images are caused to move along the diagonals by alternate application of azimuth correction and objective prism rotation. In general, one image will arrive at the apex first, a condition which will then invoke latitude correction, to be followed by further rotation of the objective prism assembly and additional arimuth correction.

It is evident that all three basic adjustments, successively acting, bring the telescope into alignment and also rotate the prisms to $a$ positions where an index read from a circular engraved reference on the telescope or a potentiometer adapted to the objective prism motor, gives the local sidereal time.

Figure 12:
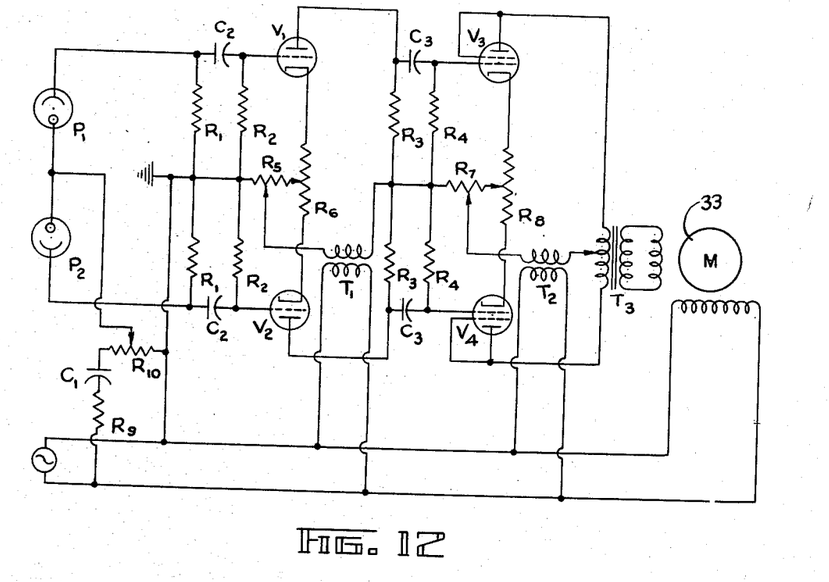
Fig. 12 is an electric wiring diagram showing the circuits associated with each pair of photo-cells included in the telescope assembly of Figs. 6 and 7.
Figure 13:
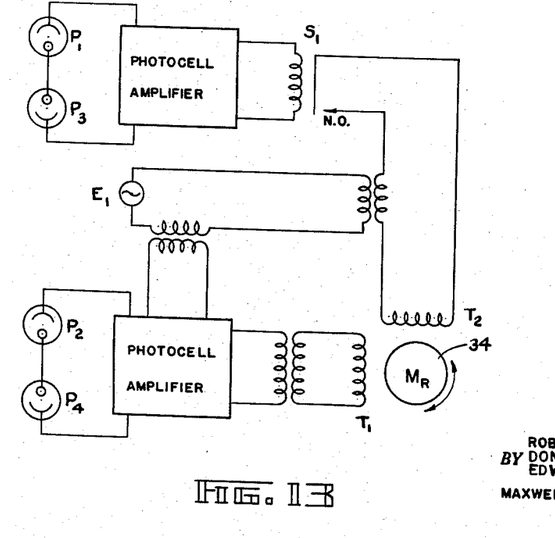
Fig. 13 is an electric wiring diagram showing the circuit providing a necessary interrelationship between the circuits associated with the pairs of photo-cells in the telescope assembly of Figs. 6 and 7.
Figure 18:
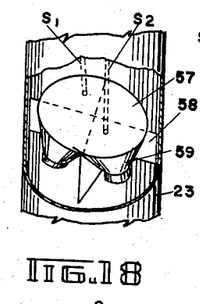
Fig. 18 depicts an alternate arrangement of four segment-shaped photocells with variable density film overlay as a substitute for the pyramidal prism scheme.

Figure 18 represents an alternate scheme for detecting starlight-beam positions. A variety of devices may be used to sense the positions of the starlight-beams. Figure 18 shows four quarter-circle segmental shaped phototubes (designed specifically for this adaptation), and so arranged that each quadrant is sensitive to one quarter of the circular area representing the field of the telescope, thus allowing opposite phototube balancing as depicted in Fig. 12 and adjacent phototube balance as depicted in Fig. 13. A light filter or mask with transparency varying with the radial distance from the apex center is displaced over the four photoelectric detectors. When the detectors are connected to balanced amplifier circuits as shown in Figs. 12 and 13, the use of the mask varies the density of the stellar light sources picked-up at the detectors so that as the stellar light spots recede or converge toward the apex center the magnitude of error as well as its direction may be sensed. Thus, the rate of correction response may be controlled by the magnitude of the error.

Figure 11:
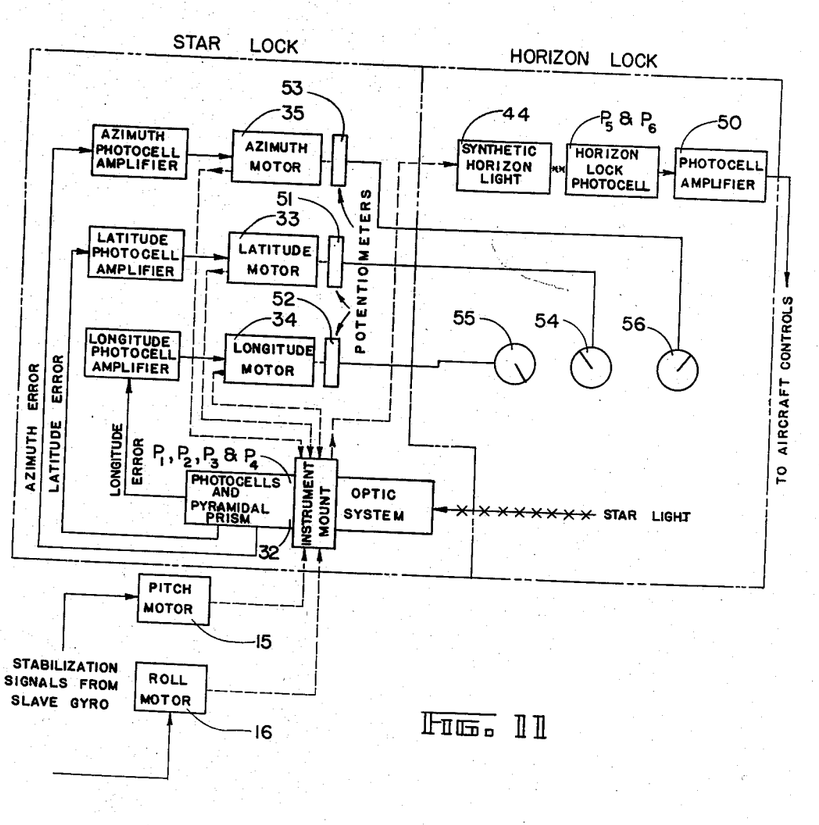
Fig. 11 is a block diagram showing the mechanical electrical and photo-electrical systems included in a control device embodying this invention.

Fig. 11 depicts a block diagram of the device embodying this invention. This device can be considered as divided into two major components which are designated as "star-lock" and "horizon-lock." The star-lock is obtained by continuously gathering the light from two chosen stars $S_1$ and $S_2$ and directing it through the telescope objective prisms 28 and 29 and lens 30 to a pyramidal prism 32 with its associated photo-electric pickup in the base of the telescope (Fig. 6). Errors generated in this pickup are fed to suitable corrective motors 33, 34 and 35 that keep the telescope "fixed" on the two selected stars and thereby maintain its longitudinal or optical axis parallel to the polar axis of the earth.

Figure 9:
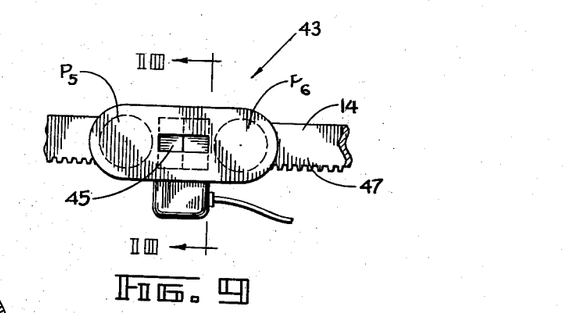
Fig. 9 is an elevational view of an assembly shown in Fig. 8.
Figure 10:
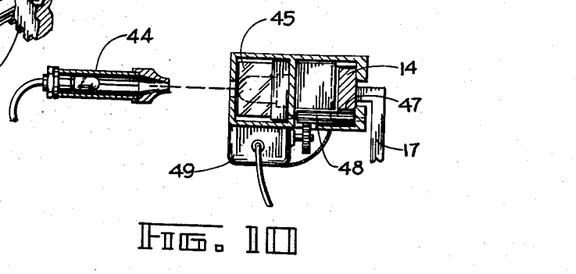
Fig. 10 is a sectional view taken along the line 10—10 of Fig. 9.

The horizon-lock is obtained from a wedge prism and photo-electric pickup assembly 43 (Fig. 5). This pickup 43 is mounted on the inner gimbal ring 14 which represents a synthetic horizon, and the pickup can be set at any bearing or azimuth determined by the calculated flight-path or great-circle bearing of the aircraft. A synthetic light source 44 is affixed to the telescope mounting standards 21, and is disposed in the plane of the synthetic horizon. This light source 44 produces a beam of light that impinges upon a wedge prism 45 in the assembly 43 (Figs. 9 and 10).

Stabilizing or error correction voltages are fed from a precision "slave-gyro" to the pitch and roll motors 15 and 16 at the instrument "stabilized platform" gimbal mountings. The pitch and roll motors correct for any unstable motions to which the instrument may be subjected, because of aircraft motions.

The telescope latitude or elevation axis is controlled by the motor 33 affixed to the altazimuth telescope mountings or standards 21 and it receives error voltages from the photocell amplifiers and pickup associated with the star-lock pyramidal prism 32 within the telescope base. Thus, one-half of the pyramidal prism (two opposite sides) correct alignment errors of the telescope about the elevation or latitude axis, while the other two opposing sides of the pyramidal prism 32 furnish error correcting voltage signals in azimuth alignment to the motor 35 which controls the azimuth plate and is affixed to the suspension bracket 17, upon which said plate revolves, and energized by the azimuth photocells and amplifier.

The telescope objective prisms 28 and 29 are rotated by the reversing motor 34 to effect "tracking" of the stars, and this motor is affixed to the housing 26 which is mounted on a "slip-gear train," at the objective end of the telescope. This system corrects errors or misalignments, that is, the conditions shown in Figs. 14 thru 17 of the star images in a plane normal to the sidereal motion and thus furnishes an instantaneous position at the actual longitude traversed along the flight-path by tracking the stars around the polar axis, and thus measuring the difference between the apparent sidereal time and the sidereal time at the point of launching.

Errors in position of the device 10 and associated aircraft along the actual flight-path are compensated and detected by the circuitry depicted in Figs. 12 and 13. Star light is collected by the telescope objective prisms 28 and 29 and is received at the pyramidal prism 32 located at the base of the telescope. Thus, superimposed spots of light are reflected, when on course, at the apex of the four-sided pyramidal prism and thus received equally by all of the four photocells or photomultiplier tubes $P_1$, $P_2$, $P_3$ and $P_4$ suitably arranged around the prism. Thus, when the light beams are centered on the apex of the prism, the four photocells receive, ideally, the same quantity of light. The photocells on opposite sides of the prism are connected to a suitable amplifier which is capable of recognizing both the magnitude and the direction of any unbalance in the light received by its associated pair of photocells. However, it will be noted that the light signals received from the pyramidal prism are of constant magnitude and/or balanced in the amplifier circuit of the star-lock, so that balancing out position errors of the light beams is the prime function of this circuit. It is apparent that deflection of the light beam from its zero-error position produces an unbalance in one or more of the amplifier circuits. This results in properly directed torques on the rotors of the associated two phase motors. The schematic diagrams Figs. 12 and 13 suggest that both photocells and amplifier tubes may be supplied by an A.C. power source. It is possible that the use of a D.C. anode voltage supply may be found more practical, particularly in the star-lock circuits where very low signal levels will be encountered. The use of A.C. plate supply voltage, leads to tube currents comprised of half-sinusoids in resistors $R_1$ and $R_3$. The net current in the primary of $T_3$ will be determined in magnitude and direction by the unbalance of light energy received by photocells $P_1$ and $P_2$ or $P_3$ and $P_4$ as well as adjacent combinations in Fig. 13. The transformer $T_3$ serves to smooth-out the current variations which tend to reduce pulsations in the torque applied to the rotor of the two phase motor. The phase-shifting circuits represented by $C_1R_{10}$, $C_2R_2$ and $C_3R_4$ introduce the desired phase difference between the currents in the two stator windings of the motor M. This might also be accomplished by the use of a larger capacitance located in series with one of the stator windings. The adjustments provided by $R_5$, $R_6$ and $R_7$ and $R_8$ permit compensation for circuit and tube differences as well as for initial unbalance in the distribution of the light beam to the four photocells.

To detect and properly correct for the error condition referred to previously as the separated beam, it is necessary to utilize the information that one pair of photocells $P_1$ and $P_2$ (Fig. 16) is illuminated and the other pair $P_3$ and $P_4$ receives no light energy. Under these conditions both of the amplifier circuits associated with the azimuth and latitude corrections, respectively, will be in balance and no error signal will be delivered to the corresponding motors. Therefore to correct the separated beam error, it will be necessary to develop a signal when an unbalance exists between each adjacent pair of photocells, that is, $P_2$ and $P_4$, $P_1$ and $P_3$, while each pair of opposite photocells remains in balance. Fig. 13 illustrates how this may be carried out. One of the windings, $T_1$, of the telescope objective prism alignment motor 34 is energized by the output of its photocell amplifier. Photocells $P_2$ and $P_4$ are unequally illuminated, thus sensing an unbalance between these adjacent photocells. At the same time, the photocells $P_1$ and $P_3$ are also unequally illuminated. However, if the error signal in the output of an amplifier resulting from this unbalance were used to energize winding $T_2$ of motor 34, the system could not sense the direction of error. This is because a positioning of the two light spots so that the alternate pair of photocells $P_3$ and $P_4$ are illuminated, causes a reversal of phase in both windings $T_1$ and $T_2$. Thus, there is no change in the direction of rotation of motor 34. To provide the desired sensing property, one of the amplifiers is used to operate a relay $S_1$, when an unbalance occurs, regardless of direction. Thus, for a scheme as depicted by Fig. 13, winding $T_2$ is always energized in the same direction (phase) with respect to the reference voltage $E_1$. The change in position of the light spot, will then produce a change in phase in the voltage applied to $T_1$ only, and the direction of rotation of motor 34 is reversed.

It will be noted that light levels transmitted thru the telescope to the pyramidal prism 32 cannot be expected to be very high even with stars of first magnitude. Since the sensitivity of presently available photoemissive structures is in the range of 50 microamperes per lumen, it may be desirable to replace photocells with photomultiplier tubes as the pickup means in the star-lock circuits. It may also be desirable to employ an A.C. dynode supply for the photomultiplier.

The position of the bearing-point light beam is controlled by the azimuth motor 35, which as previously stated controls rotation of the azimuth plate 19 and the synthetic bearing-point light projector 44 affixed to the telescope standards. Thus, a synthetic beam of light is directed toward the wedge prism 45 mounted in a suitable housing 46 which is displaced in the plane of the synthetic horizon and pre-set in a position at 90 degrees to the calculated bearing of the flight-path.

Figure 8:
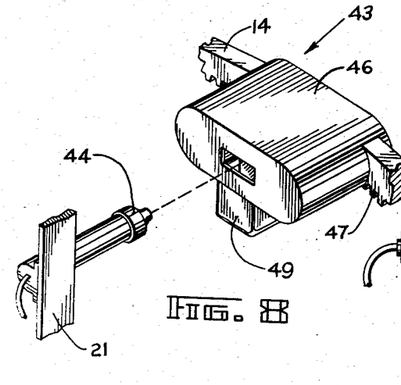
Fig. 8 is a fragmentary perspective view of another portion of the device of Fig. 5.

Preferably, as seen in Figs. 8, 9 and 10, the inner gimbal ring 14 has a gear rack 47 extending along an edge thereof and in mesh with a pinion 48 rotatably mounted in the housing 46 (Fig. 10) and driven by a reversible motor 49. The motor 49 is mounted in the assembly 43 and can be remotely controlled to move the assembly 43 along the ring 14 to a position corresponding to any desired bearing point. Photocells $P_5$ and $P_6$ are mounted within the housing 46 at the opposite sides of the wedge-shaped prism 45 and receive equal quantities of light when the light beam from projector 44 strikes against the apex or knife edge of the prism 45 by reason of the fact that the associated aircraft or missile is on the preselected flight path. Any deviation from the preselected great-circle flight path displaces the light beam projector 44 in the plane of the horizon so that the beam of light emitted therefrom no longer impinges against the edge of prism 45 and the photocells $P_5$ and $P_6$ receive unequal quantities or intensities of light. The photocells $P_5$ and $P_6$ are associated with an amplifier circuit 50 (Fig. 11), similar to the circuit shown in Fig. 12 in connection with the photocells $P_1$ and $P_2$, and the output from circuit 50 controls a conventional servosystem (not shown) for actuating the aerodynamic controls of the aircraft or missile so that the latter is yawed, in one direction or the other, to return to the preselected flight path.

If the horizon lock portion of the device 10 becomes inoperative for a short period of time, flight path errors occurring during the period of inoperativeness will be immediately sensed when operation is resumed, providing that the part of the device keping the telescope locked on the two selected stars $S_1$ and $S_2$ remains operative during the inoperativeness of the horizon lock mechanism.

Since the bearing point $g$ or $g'$, to which the position of the horizon-lock pickup assembly 43 on the gimbal ring 14 corresponds, is invariant for the entire length of the flight path, it is apparent that the regulation or control of the aircraft or missile is independent of the speed or time in flight thereof. Thus, the aircraft or missile is maintained on the desired flight path following a great circle between the launching or take-off site and the destination or target even when winds of unexpected velocity are encountered to either increase or decrease the actual speed.

Further, since the movements produced by the motors 75 33, 34 and 35 are functions of the latitude, longitude and azimuth of the aircraft or missile, potentiometers 51, 52 and 53 (Figs. 5 and 11) are associated with the shafts of the respective motors and control related indicating instruments 54, 55 and 56 (Fig. 11) so that, by reading said instruments, the position of the aircraft or missile can be easily ascertained.

Figure 19:
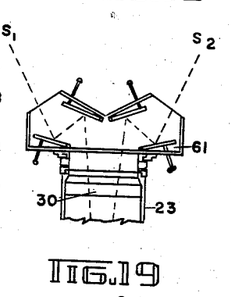
Fig. 19 represents adjustable mirrors displaced in the objective prism housing assembly in lieu of ground precision prisms.

Figure 19 depicts a system or mirrors 60 and 61 to reflect star images in lieu of the objective prisms 28 and 29. The polar declination angles of incident starlight governs the displacement of the mirrors within the objective prism housing 26.

Figure 20:
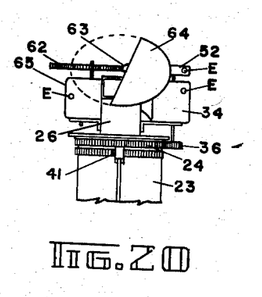
Figs. 20 and 20a represent an intermittent light chopper scheme.
Figure 20A:
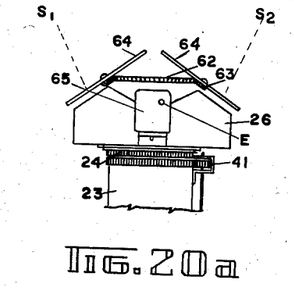

Figure 20 depicts a scheme utilizing intermittent light chopper discs. The light choppers may be used in the path of the starlight sources to permit the use of conventional capacitance-coupled high-gain amplifiers and thus reduce the difficulties encountered due to drift of D.C. voltages and circuit element values. The use of light choppers does not in any way, modify the basic detection and control circuitry. The number of amplifiers and motors is unaltered, it being assumed that a single telescope and chopper assembly is intended. A motor 65 may be adapted to prism housing 26, and incorporating bevel and spur gears 63 and 62 respectively, to rotate the shopper discs 64.

Although an illustrative embodiment of the invention has been described herein and shown in the accompanying drawings, it is to be understood that the invention is not limited to that precise embodiment, and that various changes and modifications may be effected therein without departing from the scope or spirit of the invention as defined in the appended claims.

What is claimed is:

1. In an automatic celestial navigation control device of the described character for guiding an aircraft and the like; the combination including a gyro-stabilized gimbal mounted platform defining a plane which is parallel to a tangent plane to the earth's surface, a telescope automatically sighting on two stars simultaneously while the optical axis of the telescope is parallel to the earth's polar axis, said telescope being mounted on said platform for movement relative to the latter in elevation and azimuth thereby to provide latitude and bearing orientation, and being also rotatable about its optical axis to provide local longitude orientation and local sidereal time.

2. In an automatic celestial navigation control device of the described character for guiding an aircraft and the like; the combination including a gyro-stabilized gimbal mounted platform defining a plane which is parallel to a tangent plane to the earth's surface; a telescope automatically sighting on two stars simultaneously while the optical axis of the telescope is parallel to the earth's polar axis, said telescope being mounted on said platform for movement relative to the latter in elevation and azimuth thereby to provide latitude and bearing orientation, and being also rotatable about its optical axis to provide local longitude orientation and local sidereal time, said telescope including an objective prism assembly having a housing and precision light deflecting means set in said housing at the objective end of the telescope to track two stars and to provide superposed images of the two tracked stars when in a predetermined proper alignment.

3. In an automatic celestial navigation control device of the described character for guiding an aircraft and the like; the combination as in claim 2 further including means for rotating said housing about the optical axis of the telescope and having a slip-gear train to differentially provide sidereal tracking of the stars by the objective prism assembly and rotation by a sidereal motor.

4. In an automatic celestial navigation control device of the described character for guiding an aircraft and the like; the combination as in claim 3, further including means for rotating said slip-gear train at a constant twenty-four hour sidereal rate.

5. In an automatic celestial navigation control device of the described character for guiding an aircraft and the like; the combination as in claim 4, further including means for intermittently chopping the incoming starlight source to permit the use of capacitance-coupled high-gain amplifiers.

6. An automatic celestial navigation control device for guiding an aircraft along a great circle flight path according to claim 5; wherein said light sensitive means includes photoelectric cells associated with the several faces of said four-sided pyramidal prism, and electrical circuit means coupling together, in pairs, the photoelectric cells associated with the opposed faces of said pyramidal prism to produce corrective signals for actuating the drive means effecting movements in said planes of latitude and azimuth in response to unequal excitation of the photo-electric cells in said pairs and for actuating the drive means effecting movements in the plane of longitude in response to unequal excitation of the cells in different pairs.

7. In an automatic celestial navigation control device of the described character for guiding an aircraft and the like; a telescope sighting on two stars simultaneously, a pyramidal prism and an arrangement of photosensitive detectors at the base of the telescope, and an objective lens in the telescope focusing the incoming starlight beams from the two stars at the apex of the prism for energizing said detectors.

8. In an automatic celestial navigation control device for guiding an aircraft and the like; a telescope assembly superposing the light images of two stars at a focal point on the optical axis of the telescope when said axis extends parallel to the polar axis of the earth, and photoelectric detector means having a sensitized field disposed at said focal point and contacted by the light images there superposed, said detector means providing reference alignment of the device in longitude and bearing planes as well as in latitude.

9. In an automatic celestial navigation control device for guiding an aircraft and the like; a telescope assembly superposing the light images of two stars at a focal point on the optical axis of the telescope when said axis extends parallel to the polar axis of the earth, and photo-sensitive detector means in the telescope base including a pyramidal prism having its apex at said focal point, four photocells receiving light from the four related side faces of said prism and associated amplifiers so that said detector means provides reference alignment of the device in longitude and bearing planes as well as in latitude.

10. In an automatic celestial navigation control device for guiding an aircraft and the like; a telescope assembly superposing the light images of two stars at a focal point on the optical axis of the telescope when said axis extends parallel to the polar axis of the earth, and photo-sensitive detector means in the base of said telescope including four quarter-circle, triangular-segmental shaped phototubes with a varying density mask overlay and associated amplifiers so that the relationship of said light images to said phototubes provides reference alignment of the device in longitude and bearing planes as well as in latitude.

11. In an automatic celestial navigation control device for guiding an aircraft and the like; a telescope sighting on two stars simultaneously while the optical axis of the telescope is parallel to the polar axis of the earth, said telescope being movable in elevation and azimuth to provide latitude and bearing orientation and also about its optical axis to provide longitude orientation, motors driving said telescope for longitude, latitude and bearing orientation of the latter, and potentiometers operatively connected to said motors to provide direct geographic readings for navigational reference in a manned aircraft.

12. In an automatic celestial navigation control device for guiding an aircraft and the like; a telescope as in claim 11, which is mounted on standards which rotate through 360 degrees in the plane of the horizon as defined by a gyro-stabilized platform carrying said standards, and a bearing point projector lamp attached to said standards for rotation with the latter.

13. An automatic celestial navigation control device according to claim 11; wherein said sensing means includes a wedge-shaped prism, photo-electric cells at the opposite sides of said wedge-shaped prism, and electric circuit means producing corrective signals for actuating the aerodynamic controls of the guided aircraft in response to any unbalance between the light received by said photo-electric cells associated with the wedge-shaped prism; and wherein said exciting means includes a light beam projector movable in said plane of the horizon and projecting a beam of light that strikes said wedge-shaped prism at the edge of the latter when the guided aircraft is on course so that the light received by the photo-electric cells associated with said wedge-shaped prism is then balanced.

14. In an automatic celestial navigation control device of the described character for guiding an aircraft or the like; the combination including a gyro-stabilized platform mounted in gimbals and defining a synthetic horizon, a telescope mounted in standards on said platform for movement in elevation and azimuth relative to the latter, said platform being rotatable through 360 degrees, a bearing point projector lamp attached to said standards for rotation with said platform, mechanism attached to the inner one of said gimbals and adjustable along the latter to cooperate with said lamp in maintaining a predetermined heading, and means for effecting the adjustment of said horizon-lock mechanism along said inner gimbal.

15. An automatic celestial navigation control device for guiding an aircraft and the like; said device comprising a gyro-stabilized member defining a plane parallel with a plane tangent to the earth's surface; course selecting means adjustably movable along a circle in said plane; support means rotatable on said gyro-stabilized member about an axis concentric with said circle and extending normal to said plane; a telescope assembly mounted on said support means and adapted to simultaneously sight on two fix stars, said telescope assembly being arranged so that the images of the two fix stars are superposed at the focal point of the telescope assembly when the optical axis of the latter extends parallel to the polar axis of the earth; means responsive to the star light collected by said telescope assembly and operative to maintain the axis of the latter parallel to the polar axis of the earth; and course indicating means movable with said telescope assembly about said axis concentric with said circle and extending at ninety degrees to the direction of travel, said course indicating means cooperating with said course selecting means so that, when the latter is set at a position at ninety degrees from the direction of a desired great circle flight path, said course selecting means will emit signals for correcting the actual direction of flight whenever the latter deviates from said desired great circle flight path.

16. An automatic celestial navigation control device for guiding an aircraft along a great circle flight path; said device comprising a gyro-stabilized member movably mounted on the guided aircraft and defining a plane parallel to a plane tangent to the earth's surface; means on said member defining a bearing point at ninety degrees to the bisecting plane of the earth extending through the desired flight path; means defining a fix axis remaining parallel to the polar axis of the earth and being rotatable relative to said gyro-stabilized member about an axis normal to said plane tangent to the earth's surface; course indicating means extending at ninety degrees to the direction of travel of the guided aircraft in said plane tangent to the earth's surface to cooperate with said bearing point defining means; and means responsive to any deviation of said course indicating means from said bearing point defining means to generate corrective signals for returning the guided aircraft to the desired flight path.

17. An automatic celestial navigation control device for guiding an aircraft along a great circle flight path; said device comprising a gyro-stabilized member movably mounted on the guided aircraft and defining a plane parallel to a plane tangent to the earth's surface; telescope means operative to simultaneously collect light from two selected stars and to superpose the images of said stars when the optical axis of said telescope means is parallel to the polar axis of the earth; means mounting said telescope means on said gyro-stabilized member for movements in the planes of longitude, latitude and azimuth, respectively; means responding to any deviation of said images of the selected stars from the superposed condition of the images corresponding to the parallel positioning of said optical axis with respect to said polar axis to move said telescope means until said optical axis of the latter is restored to said position parallel to the polar axis; light projecting means movable with said telescope means in said plane of azimuth and extending at ninety degrees to the direction of travel of the guided aircraft; and light sensitive means carried by said gyro-stabilized member and adjustable with respect to the latter along a circular path concentric with the axis of movement of said telescope means in said plane of azimuth, said light sensitive means being adapted to be positioned at ninety degrees to the direction of the desired great circle flight path and cooperating with said light projecting means to sense any deviation of the light emitted by said projecting means from said light sensitive means, and hence, any departure of the guided aircraft from the desired flight path.

18. An automatic celestial navigation control device for guiding an aircraft along a great circle path; said device comprising a gyro-stabilized member adapted to be movably mounted on the guided aircraft and defining a plane parallel to a plane tangent to the earth's surface; telescope means including two objective prisms arranged to collect light from two selected stars and a four-sided, pyramidal prism disposed with its apex at the focal point of the telescope means and adapted to have the images of the two stars superposed on said apex when the optical axis of the telescope means is parallel with the polar axis of the earth; light sensitive means sensing any unbalance in the light emitted from the four sides of said pyramidal prism as a result of the deviation of at least one of the star images from said apex; means mounting said telescope means on said gyro-stabilized member for movements of said objective prisms in the planes of longitude, latitude and azimuth; drive means controlled by said light sensitive means to move said objective prisms of the telescope means in at least one of said planes of latitude, longitude and azimuth to restore said telescope means to the condition where said optical axis of the latter is parallel to said polar axis; light projecting means movable with said telescope means in said plane of azimuth and extending at ninety degrees from the direction of travel of the guided aircraft; and light sensitive means carried by said gyro-stabilized member and adjustable with respect to the latter along a circular path concentric with the axis of movement of said telescope means in said plane of azimuth, said light sensitive means being adapted to be positioned at ninety degrees to direction of the desired great circle flight path and cooperating with said light projecting means to sense any deviation of the light emitted by said projecting means from said light sensitive means and, hence, any departure of the guided aircraft from the desired flight path.

19. An automatic celestial navigation control device for guiding an aircraft along a great circle flight path; said device comprising a gyro-stabilized ring member adapted to be movably mounted on the guided aircraft and defining a plane parallel to a plane tangent to the earth's surface; telescope means including two objective prisms arranged to collect light from two selected fix stars and a four-sided, pyramidal prism disposed with its apex at the focal point of the telescope means and adapted to have the images of the two fix stars superposed on said apex when the optical axis of the telescope means is parallel to the polar axis of the earth; means for rotating said objective prisms about said optical axis of the telescope means at the sidereal rate; light sensitive means sensing any unbalance in the light emitted from the four sides of said pyramidal prism as a result of the deviation of at least one of the star images from said apex; means mounting said telescope means on said gyro-stabilized member for movements of said objective prisms in the planes of longitude, latitude and azimuth; drive means controlled by said light sensitive means to move said objective prisms of the telescope means in at least one of said planes of latitude, longitude and azimuth to restore said telescope means to the condition where said optical axis of the latter is parallel to said polar axis; light projecting means movable with said telescope means in said plane of azimuth and extending at ninety degrees to the direction of travel of the guided aircraft; and light sensitive means carried by said gyro-stabilized member and adjustable with respect to the latter along a circular path concentric with the axis of movement of said telescope means in said plane of azimuth, said light sensitive means being adapted to be positioned at ninety degrees to direction of the desired great circle flight path and cooperating with said light projecting means to sense any deviation of the light emitted by said projecting means from said light sensitive means and, hence, any departure of the guided aircraft from the desired flight path.

20. An automatic celestial navigation control device for guiding an aircraft along a great circle flight path; said device comprising a gyro-stabilized ring member adapted to be movably mounted on the guided aircraft and defining a plane parallel to a plane tangent to the earth's surface; telescope means collecting light from two selected fix stars and including a prism receiving the collected star light and emitting substantially equal quantities of light from the sides thereof when the optical axis of said telescope means is parallel to the polar axis of the earth; means mounting said telescope means on said stabilized ring member for movements relative to the latter in the planes of longitude, latitude and azimuth so that the telescope means is free to track said fix stars; light sensitive means associated with said prism and responding to any unbalance in the quantities of light emitted from the sides of said prism as a result of the deviation of said optical axis from the polar axis to produce corrective signals for overcoming such deviation; drive means controlled by said light sensitive means and operative to swing said telescope means in said planes of longitude, latitude and azimuth in response to corrective signals from said light sensitive means so that said optical axis of the telescope means is maintained parallel to the polar axis; means imparting a continuous rotation to said telescope means about its optical axis at the sidereal rate; and cooperating means movable with said telescope means in the plane of said horizon and adjustable on said ring member, respectively, and arranged at ninety degrees to the direction of travel of the guided aircraft and at ninety degrees to the bisecting plane of the earth extending through the desired flight path, respectively, to produce corrective signals for returning the guided aircraft to the desired flight path whenever the aircraft deviates from said path.

21. An automatic celestial navigation control device for guiding an aircraft along a great circle flight path according to claim 4; wherein said telescope means includes two objective prisms arranged to sight on the two selected fix stars, and said prism receiving the collected star light is a four-sided pyramidal prism disposed with its apex at the focal point of the telescope means so that the images of the two fix stars are superposed at the apex of said pyramidal prism when the optical axis of said telescope means is parallel to the polar axis of the earth.

22. An automatic celestial navigation control device for guiding an aircraft along a great circle flight path according to claim 4; wherein said means producing corrective signals for returning the guided aircraft to the desired flight path whenever the aircraft deviates from said path includes a light beam projector movable with said telescope means and emitting a beam of light in said plane parallel to said tangent plane to the earth's surface, a wedge-shaped prism adjustable along said stabilized ring member and disposed at a location on the latter at ninety degrees to the bisecting plane of the earth extending through the desired flight path, said projector being disposed so that, when the optical axis of said telescope means is parallel to the polar axis of the earth and the aircraft, with which said ring member moves, is disposed on the desired flight path, said beam of light strikes the edge of said wedge-shaped prism and equal quantities of light are emitted from the two sides of the latter, photo-electric cells disposed adjacent the two sides of said wedge-shaped prism and excited by the light emitted from the related sides of the latter, and electrical circuit means connected to said photo-electric cells and producing corrective signals for actuating the aerodynamic controls of the guided aircraft in response to any unbalance in the excitation of said photo-electric cells.

23. An automatic celestial navigation control device for guiding an aircraft along a great circle flight path according to claim 4; and further comprising indicating means responsive to the movements of said telescope means in said planes of longitude, latitude and azimuth to provide a continuing indication of the position of the guided aircraft along the desired flight path.

24. An automatic celestial navigation control device for guiding an aircraft along a great circle flight path according to claim 4; wherein said telescope means includes a cylindrical casing having its axis concentric with the optical axis of the telescope means, a slip ring rotatable on one end of said casing, a prism housing rotatable on said slip ring, and two objective prisms in said housing and sighting on the two selected fix stars; and wherein said means imparting rotation at the sidereal rate rotates said slip ring relative to said casing, while said drive means causing movements in the plane of longitude rotates said prism housing with respect to said slip ring.

25. An automatic celestial navigation control device for guiding an aircraft along a great circle flight path; said device comprising a base adapted to be mounted on the aircraft to be guided; a set of gyro-stabilized outer and inner gimbal rings pivoted with respect to each other and said base for movements around right angularly related axes so that said inner gimbal ring defines an artificial horizon; support means carried by said inner gimbal ring and rotatable relative to the latter about an axis normal to the plane of said horizon and concentric with said inner gimbal ring; a telescope assembly including a cylindrical casing pivoted on said support means to swing about a diametrical axis disposed in a plane parallel to that of said horizon, a prism housing, means mounting said housing on one end of said casing for rotation about the axis of the latter, two objective prisms in said housing and arranged to collect light from two selected fix stars and an objective lens in said casing causing the images of said fix stars to be superposed at the focal point of the telescope assembly when the optical axis of the latter is parallel to the polar axis of the earth; means rotating said prism housing relative to said casing at the sidereal rate; light responsive means influenced by the light collected from the two fix stars and operative to generate corrective signals whenever the optical axis of said telescope assembly deviates from the condition of parallelism to said polar axis; drive means controlled by said corrective signals from said light responsive means and operative to rotate said support means relative to said inner gimbal ring, said casing relative to said support means and said prism housing relative to said casing so that the optical axis of the telescope assembly is restored to the condition parallel to the polar axis; sensing means adjustable along said inner gimbal ring and defining a bearing point at ninety degrees to the bisecting plane of the earth passing through the desired flight path when the guided aircraft is on course; and exciting means movable with said support means relative to said inner gimbal ring and cooperating with said sensing means to produce corrective signals for operating the aerodynamic controls of the guided aircraft when the latter strays from the desired flight path.

26. In an automatic celestial navigation control device for guiding an aircraft and the like; photoelectric amplifier circuit means comprising a pair of phototubes and ancillary electronic balancing means enabling the opposed phototubes to automatically seek a position wherein said phototubes are equally energized; said means mounting the prism housing on one end of the telescope casing including a slip ring rotatable on said casing and having two circumferential gears thereon, said housing being rotatably mounted on said slip ring; said means rotating the housing at the sidereal rate including a clock controlled motor fixed on said casing and driving a pinion meshing with one of said circumferential gears; and said drive means controlled by the corrective signals from the light responsive means including a reversible electric motor fixed on said prism housing and driving a pinion meshing with the other of said circumferential gears on the slip ring.

27. In an automatic celestial navigation control device for guiding an aircraft and the like; photoelectric amplifier circuit means comprising a pair of phototubes and ancillary electronic balancing means enabling the opposed phototubes to automatically seek a position wherein said phototubes are equally energized; said telescope assembly further including a four-sided, pyramidal prism disposed with its apex at the focal point of the telescope assembly so that equal quantities of light are emitted from the four sides of said pyramidal prism when the optical axis of the assembly is parallel to the polar axis of the earth; and said light responsive means including four photo-electric cells disposed adjacent the four related sides of said pyramidal prism, and associated electrical circuits supplying corrective signals to the drive means rotating said casing relative to said support means and rotating said support means relative to said inner gimbal means in response to any unbalance in the light received by the photo-electric cells at the opposite sides of the pyramidal prism and supplying corrective signals to the drive means rotating said prism housing relative to said casing in response to any unbalance in the light received by the photo-electric cells at adjacent sides of the pyramidal prism.

References Cited in the file of this patent

UNITED STATES PATENTS

| | | |
|---|---|---|
| 2,039,878 | Boykow | May 5, 1936 |
| 2,077,398 | Clark | Apr. 20, 1937 |
| 2,316,466 | Storer | Apr. 13, 1943 |
| 2,444,933 | Jasperson | July 13, 1948 |
| 2,471,686 | Hiltner | May 31, 1949 |
| 2,492,148 | Herbold | Dec. 27, 1949 |
| 2,532,402 | Herbold | Dec. 5, 1950 |
| 2,688,896 | Tripp | Sept. 14, 1954 |
| 2,734,269 | Claret | Feb. 14, 1956 |
| 2,758,377 | Claret | Aug. 14, 1956 |
| 2,762,123 | Schultz | Sept. 11, 1956 |